Figure 1:
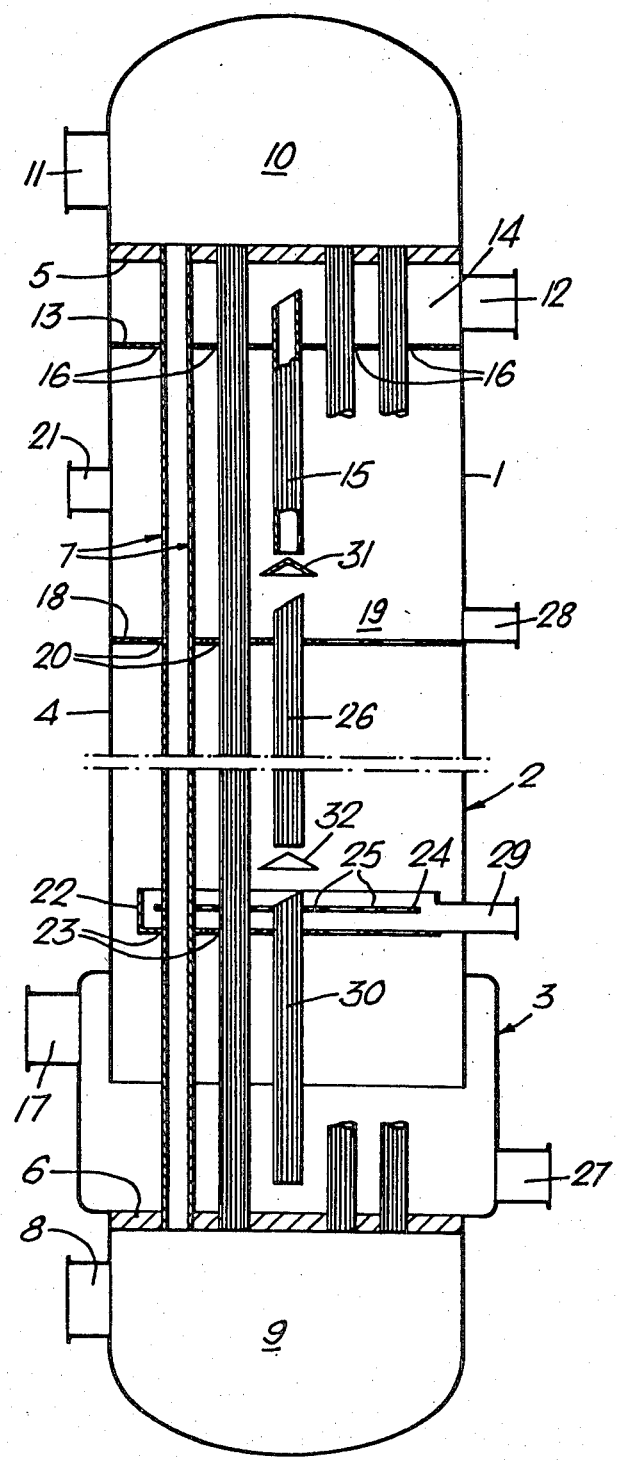

United States Patent [19]

Juhola et al.

[11] 4,422,899

[45] Dec. 27, 1983

[54] APPARATUS AND METHOD FOR THE VAPORIZATION OF LIQUID

[75] Inventors: Pentti Juhola; Arvi Artamo, both of Espoo, Finland

[73] Assignee: Rintekno Oy, Espoo, Finland

[21] Appl. No.: 305,628

[22] PCT Filed: Jan. 22, 1981

[86] PCT No.: PCT/FI81/00004

§ 371 Date: Sep. 15, 1981

§ 102(e) Date: Sep. 15, 1981

[87] PCT Pub. No.: WO81/02112

PCT Pub. Date: Aug. 6, 1981

[30] Foreign Application Priority Data

Jan. 24, 1980 [FI] Finland ................... 800216

[51] Int. Cl.³ .................. B01D 1/08; B01D 1/10; B01D 1/22
[52] U.S. Cl. ................ 159/13 B; 159/27 D; 159/49
[58] Field of Search ............... 159/27 R, 27 D, 13 B, 159/49

[56] References Cited

U.S. PATENT DOCUMENTS

| | | | |
|---|---|---|---|
| 344,586 | 6/1886 | Lillie | 159/13 B |
| 724,511 | 4/1903 | Schutt | 159/13 B |
| 2,827,267 | 3/1958 | Ris | 159/13 B |
| 2,944,966 | 7/1960 | Eickmeyer | 159/13 B |
| 3,332,469 | 1/1968 | Rosenblad | 159/13 |
| 3,366,158 | 1/1968 | Rosenblad | 159/13 |
| 3,385,268 | 5/1968 | Sprague | 122/32 |
| 3,576,178 | 4/1971 | Zmola | 122/32 |
| 3,576,179 | 4/1971 | Romanos | 122/32 |

FOREIGN PATENT DOCUMENTS

| | | |
|---|---|---|
| 1737330 | 7/1943 | Fed. Rep. of Germany . |
| 2115382 | 10/1972 | Fed. Rep. of Germany . |
| 2249581 | 10/1972 | Fed. Rep. of Germany . |
| 2307784 | 8/1973 | Fed. Rep. of Germany . |
| 44630 | 7/1968 | Finland . |
| 3422 | 6/1971 | Finland . |
| 2066 | 6/1978 | Finland . |
| 464808 | 12/1968 | Switzerland . |
| 279526 | 10/1927 | United Kingdom . |
| 1356686 | 6/1974 | United Kingdom . |
| 1390323 | 4/1975 | United Kingdom . |
| 1533224 | 11/1978 | United Kingdom . |

Primary Examiner—Bradley Garris
Attorney, Agent, or Firm—Hopgood, Calimafde, Kalil, Blaustein & Judlowe

[57] ABSTRACT

The invention is concerned with a method and an apparatus for the vaporization of liquid in a heat exchanger of the vertical-tube type, in which exchanger the vapor or liquid delivering the heat is passed through the tubes of the group (7) of tubes in the heat exchanger preferably from the bottom upwards. The group (7) of tubes is passed through at least one nozzle plate (18) or nozzle basin (22) so that nozzle openings (16, 20, 23) surrounding the tubes are formed between the openings in the nozzle plates and the tubes. In the heat exchanger the liquid to be vaporized is passed to the mantle side into the upper part of the heat exchanger or into each nozzle basin of the heat exchanger separately and is guided so as to flow downwards on the outer face of the group (7) of tubes as a liquid film. The vapor developed from the liquid film is, by means of vapor flow passages formed into the group (7) of tubes, passed from the lower part of the heat exchanger further into its object of use or from each component unit (1, 2, 3) of the heat exchanger further into its object of use.

2 Claims, 1 Drawing Figure

APPARATUS AND METHOD FOR THE VAPORIZATION OF LIQUID

The subject of the present invention is a method for the vaporization of liquid in a heat exchanger of the vertical-tube type, in which exchanger the vapour or liquid delivering the heat is passed through the tubes of the group of tubes in the heat exchanger preferably from the bottom upwards.

There are vaporizers in which the vaporization takes place from a heat surface submerged in a liquid, as well as so-called film vaporizers. In the former case the vaporization starts when the temperature of the heat face exceeds the evaporation temperature of the liquid at the pressure prevailing on the face. The hydrostatic pressure of the liquid thereby increases the evaporation temperature and thereby reduces the temperature difference available for the transfer of heat.

On the contrary, in film vaporizers there is no increase in the boiling temperature results from hydrostatic pressure. Thus, in a film vaporizer it is possible to use lower differences in temperature or, alternatively, in a film vaporizer a smaller heat face is sufficient as compared with a thermositon or kettle vaporizer.

There are two main types of film vaporizers: vertical-tube and horizontal-tube types. In vertical-tube film vaporizers the vaporization takes place inside the tube, from a liquid film flowing either downwards or upwards. On the other hand, the horizontal type film vaporizers are based on a liquid film flowing downwards on the outer surface of the tubes, which liquid film is produced by means of nozzles or punched-sheet spraying.

The subject of the present invention is vaporization performed in a film vaporizer of the vertical-tube type, and the method is accordance with the invention is mainly characterized in that the liquid to be vaporized is passed to the mantle side into the upper part of the heat exchanger or into each nozzle basin of the heat exchanger separately and is guided so as to flow downwards on the outer face of the group of tubes as a liquid film, and the vapour developed from the liquid film is, by means of vapour flow passages formed into the group of tubes, passed from the lower part of the heat exchanger further into its object of use or from each component unit of the heat exchanger further into its object of use.

The invention also includes an apparatus for carrying out the method mentioned above.

In the film vaporizer of the vertical-tube type, recovery of heat is also possible from a polluted or polluting flow of medium. Since the medium flow that delivers the heat flows in the tubes, these can be easily cleansed when required. Owing to film vaporization, the heat transfer is efficient.

The invention comes out more closely from the following description and from the attached drawing, which illustrates a heat exchanger of the vertical-tube type in accordance with the invention as a side view schematically in section.

The heat exchanger shown in the drawing comprises a vertical cylindrical shell or mantle 4, inside which a group 7 of tubes if fitted by means of tube plates 5 and 6. In the lower part of the heat exchanger there is an inlet connection 8 for passing heat exchange fluid, such as vapour or possibly liquid, into the space 9 in the lower part of the heat exchanger and from there further inside the tubes in the group 7 of tubes upwards into the space 10 in the upper part of the heat exchanger, from which the vapour or liquid escapes through the connection 11. It is also possible that the vapour or liquid is passed into the heat exchanger through the connection 11, in which case its direction of flow in tubes in the group of tubes 7 is from the top downwards and in which case the vapour or liquid escapes from the heat exchanger through the connection 8 in the lower part.

It has been arranged so that the liquid to be vaporized is passed to the mantle side of the heat exchanger, i.e. into the closed space defined by the mantle 4 of the heat exchanger and by the outer face of the tubes in the group 7 of tubes and by the tube plates 5 and 6. The liquid to be vaporized is passed into the heat exchanger through a connection 12 placed in its upper part onto the nozzle plate 13. A nozzle basin 14 is formed on the nozzle plate 13, where the position of the surface of the liquid is determined by the overflow pipe 15. The nozzle plate 13 of the nozzle basin 14 is arranged so that it at the same time functions as a support plate for the tubes in the group 7 of tubes, whereby the nozzles 16 have been produced by providing the holes drilled for the tubes with notches around the periphery of the holes. From the nozzle basin 14 the liquid to be vaporized is, by means of the nozzles 16, passed so as to flow as a liquid film on the outer face of the tubes downwards. The nozzles 16 are dimensioned so that the tubes in the group of tubes are wet, i.e. covered by a liquid film, over their entire division length. The heat exchanger may be of such a type that the vapour developed from the liquid film is, by means of vapour flow passages formed into the group 7 of tubes, passed from the lower part of the heat exchanger through the connection 17 further to the object of use, or from each component unit 1, 2 and 3 of the heat exchanger further to the object of use. If the system is of the latter type, the nozzle plates between the component units 1, 2 and 3 of the heat exchanger must be such that they may operate separately and only the liquid film passes through the entire length of the group 7 of tubes; in other words, in accordance with the type of nozzle plate placed between the component units 1 and 2 of the heat exchanger, which nozzle plate 18 prevents the passing of vapour downwards beyond the plate but, however, forms a new nozzle basin 19 above the plate, from which the nozzles 20 guide the liquid to flow again further on the outer face of the tubes in the group 7 of tubes as a liquid film, whereby the uniformity of the liquid film is guaranteed. If the vapour is passed from each component unit 1, 2 and 3 of the heat exchanger separately further to the object of use, this takes place, as is illustrated in connection with the component unit 1, via the connection 21. If the heat exchanger is of such a type that the vapour is passed from each component unit 1, 2 and 3 separately to the object of use, the nozzle plate or basin between the component units 2 and 3 must, of course, be of the same type as that between the component units 1 and 2.

If the vapour vaporized from the liquid film in the heat exchanger is passed from the heat exchanger exclusively through the connection 17 placed in the lower part of the heat exchanger, the nozzle plate 18 between the component units 1 and 2 must of course be replaced by a nozzle basin—such as, e.g., the one placed between the component units 2 and 3—that does not prevent the access of vapour from the component unit 1 to the component unit 2. Between the component units 2 and 3 the drawing shows a nozzle basin 22, in which nozzle openings 23 have been formed between the bottom plate of the basin and the tubes in the groups 7 of tubes, which openings may be, e.g., annular nozzle openings surrounding the tubes. Between the component units 2 and 3 the drawing shows a nozzle basin 22 that requires a separate support plate 24 in its connection to support the tubes in the group 7 of tubes and placed at a distance above the bottom plate of the nozzle basin 22. When the apparatus is in operation, such a support plate 24 is submerged in the liquid in the nozzle basin, whereby it does not break the liquid films flowing downwards along the tubes in the group 7 of tubes. In such a case the support plate 24 must have ample flow openings 25 for the liquid at the portions between the tubes in the group 7 of tubes.

In each component unit 1, 2 and 3 in the nozzle basin above the component unit the liquid level is determined by an overflow pipe, which may be a short pipe just passing beyond the nozzle plate or a longer overflow pipe of the type shown in the drawing. Between the overflow pipes 15 and 26 there is a guide plate 31 to prevent flow from the upper overflow pipe 15 straight into the lower overflow pipe 26. There is a corresponding guide plate 32 between the overflow pipes 26 and 30.

The liquid flowing into the lowest part of the heat exchanger is collected in the basin above the tube plate 6, from where it is removed via the connection 27.

The liquid may also be passed by means of pressure via the connection 12 into the upper part of the heat exchanger. If required, the formation of the liquid film in the component units 2 and 3 may be controlled by passing liquid to be vaporized through connections 28 and 29 into the corresponding nozzle basins.

The heat exchanger in accordance with the present invention is in particular suitable for purposes in which polluted vapour is passed through the connection 8 into the tubes in the group 7 of tubes of the heat exchanger, for any contaminations collected on the inside faces of the tubes may be easily removed from the tubes, for example, by during the operation of the apparatus injecting a detergent liquid into the space 10 above the group 7 of tubes, which liquid flows down along the inside face of the tubes in the group 7 of tubes thereby removing the contaminations and carrying them along into the lower part of the heat exchanger, from which they can be removed easily.

We claim:

1. A heat exchanger of the film vaporizer vertical tube type which comprises:

a shell or mantle having closed upper and bottom parts and a bank of tubes therein vertically supported by means of first and second tube-supporting end plates, with one plate located adjacent the bottom part of said mantle and defining an end space therewith, and the other end plate located adjacent the upper part thereof and defining an end space therewith, each of said end spaces being adapted to receive heat exchanger fluid therein for flowing through said tubes in heat exchanger relationship therewith, a nozzle plate located intermediate said tube-supporting end plates and having openings therein through which said tubes pass, said nozzle plate extending and contacting the inner walls of said mantle, each of said openings defining with respect to the tube passing therethrough a film-forming nozzle for feeding liquid down and along the surface of said tube, at least one nozzle basin spaced from said nozzle plate through which the tubes pass, said basin similarly having nozzle openings through which the tubes pass which define with said tubes film-forming nozzles for feeding liquid down and along the surface of said tubes, said at least one nozzle basin having a tube-support plate spaced from its bottom such as to be submerged in the liquid reservoir during operation of said heat exchanger and thus assure a continuous flow of liquid film down along said tubes, the nozzle basin tube-support plate also having openings therein between the spaced tubes passing through said plate, said at least one nozzle basin having at least one overflow pipe for allowing excess liquid to overflow into said pipe down to another nozzle basin located below said at least one nozzle basin, means for feeding heat exchange fluid into one of said end spaces of said mantle for passage through said tubes and out through the other end space of said mantle, means for feeding liquid to be evaporated into the interior of the mantle in the space outside of said tubes onto a nozzle plate and onto at least one nozzle basin to provide a reservoir of said liquid for flowing through the nozzles surrounding the tubes and provide a liquid film flowing down and along the surface of said tubes for evaporation by heat exchange fluid flowing through each of said tubes, and means by which the vapor formed from the liquid is removed from said mantle.

2. A method for the varporization of a liquid in a heat exchanger of a vertical tube type which comprises:

providing a shell or mantle having closed upper and bottom parts and a bank of tubes therein vertically supported by means of first and second tube-supporting end plates, with one plate located adjacent the bottom part of said mantle and defining an end space therewith, and the other end plate located adjacent the upper part thereof and defining an end space therewith, each of said end spaces being adapted to receive heat exchange fluid therein for flowing through said tubes in heat exchange relationship therewith, said mantle having a nozzle plate located intermediate said tube-supporting end plates and having openings therein through which said tubes pass, said openings defining with respect to each of the tubes film-forming nozzles for feeding liquid down and along the surface of said tubes, said nozzle plate extending and contacting the inner walls of said mantle, said mantle also having at least one nozzle basin spaced from said nozzle plate through which the tubes pass, said basin similarly having nozzle openings which define with said tubes film-forming nozzles for feeding liquid down and along the surface of said tubes, said at least one nozzle basin having a tube-support plate spaced from its bottom such as to be submerged in the liquid reservoir during operation of said heat exchanger and thus assure a continuous flow of liquid film down along said tubes, the nozzle basin tube-support plate also having openings therein between the spaced tubes passing through said plate, said at least one nozzle basin having at least one overflow pipe for allowing excess liquid to overflow into said pipe down to another nozzle basin located below said at least one nozzle basin, said mantle also having means for feeding heat exchange fluid into one of said end spaces of said mantle for passage through said tubes and out through the other end space of said mantle, including means for feeding liquid to be evaporated into the interior of the mantle in the space outside of said tubes onto a nozzle plate and onto at least one nozzle basin to provide a reservoir of said liquid for flowing through the nozzles surrounding the tubes and provide a liquid film flowing down and along the surface of said tubes for evaporation by heat exchange fluid flowing through each of said tubes, and means by which the vapor formed from the liquid is removed from said mantle, feeding to one end space of said mantle heat exchange fluid and causing said fluid to flow from said end space through said tubes into the other end space and out of said mantle, feeding liquid to be evaporated into the upper part of said mantle onto said nozzle plate and via film-forming nozzles in said plate down along the surface of said tubes as a liquid film to at least one nozzle basin containing a reservoir of fluid, said nozzle basin being adapted to assure further flow of liquid film along the surface of said tubes of the liquid to be evaporated, and conducting the vapor formed from said mantle.

* * * * *